Sept. 22, 1970   W. HOLLE ET AL   3,530,378
LAMP INDICATOR FOR THE BALANCE OF A WHEATSTONE BRIDGE
Filed Aug. 16, 1968

INVENTORS
Werner Holle
Arthur Kessler
By *Krafft & Wells*
ATTORNEYS

United States Patent Office 3,530,378
Patented Sept. 22, 1970

3,530,378
LAMP INDICATOR FOR THE BALANCE OF A WHEATSTONE BRIDGE
Werner Holle, Wetzlar, and Arthur Kessler, Grossaltenstadten, near Wetzlar, Germany, assignors to Ernst Leitz GmbH, Wetzlar, Germany
Filed Aug. 16, 1968, Ser. No. 753,148
Claims priority, application Germany, Aug. 24, 1967, 1,623,773
Int. Cl. G01r 27/00; G08b 21/00; H03f 1/00
U.S. Cl. 324—57                                3 Claims

ABSTRACT OF THE DISCLOSURE

In a Wheatstone-bridge circuit there are connected two sub-miniature incandescent lamps between the current supply line of the bridge on one side and a differential amplifier in the diagonal branch of the bridge on the other side. These lamps serve to indicate the balance or unbalance of the bridge. A network consisting of ohmic resistors and a voltage stabilizer is provided by means of which the sum of the voltage of both bulbs is kept constant. The elements of the network are so designed as to maintain this constant sum of the voltages of both bulbs higher than the voltage which is permissible for one bulb alone and, further, means are provided which limit the voltage supplied to one bulb to that highest permissible voltage.

CROSS-REFERENCES TO RELATED APPLICATIONS

Applicants claim priority under 35 U.S.C. 119 for application P 1623773.3 (formerly No. L 57295 IXb/42d) filed Aug. 24, 1967 in the Patent Office of the Federal Republic of Germany.

BACKGROUND OF THE INVENTION

Field of the invention

The present invention relates to a device for indicating the balance or unbalance of a Wheatstone-bridge by means of two sub-miniature incandescent lamps.

Description of the prior art

To those skilled in this particular art it is already known to indicate the balance of a Wheatstone-bridge by means of two glow lamps. Such a device is, for example, disclosed in the German Pat. 1,085,961 where these two lamps are elements in a mains operated bridge circuit, which lamps glow alternatively with different brightness.

Another German Pat., No. 1,184,860, discloses a bridge circuit to which is connected a transistorized trigger stage wherein incandescent lamps are used as collector resistors. This trigger stage must, in addition to the measuring voltage, be supplied with an A.C. voltage, and balance of the bridge is indicated by equal brightness of both lamps.

Further, there is described in the Austrian Pat. No. 248,868 an electronic photometer which is provided with two luminescent elements, the differing luminescence of which indicates in what direction the bridge is unbalanced.

However, it is a disadvantage that, owing to their electrical elements, all of these prior art devices are either mains operated or are comparatively bulky. Therefore, they cannot be incorporated into small-size instruments where space and a minimum of needed electric power is at a premium. For example, they cannot, for this reason, be used for exposure control purposes in photographic cameras.

It is, therefore, an object of the invention to provide a device for indicating the balance of a Wheatstone-bridge, which device makes use of two incandescent lamps and which is particularly suitable for mounting in small-size instruments as, for example, in photographic cameras.

It is a further object of the invention to provide an indicating device which is independent from the mains power supply.

SUMMARY OF THE INVENTION

The above mentioned objects are attained by using sub-miniature lamps as the indicating elements, for which lamps only little space and a minimum of electric feeding power is required. These lamps are available generally on the market, however, they cannot be applied with the prior art circuits since they are very sensitive against excess voltage. Further, the percentage of the reaction voltage, i.e. the voltage at which they begin to glow in respect to the highest permissible voltage of these lamps, is higher than that of regular incandescent lamps. If such sub-miniature lamps were arranged directly in the collector circuits of a transistorized amplifier, the lamps extinguish, when both collector currents are equal, that is, when the Wheatstone bridge is balanced. Therefore, the invention further comprises a network consisting of ohmic resistors and a voltage stabilizer which network serves to maintain the sum of both lamp voltages at a constant level. This level is higher than the maximum permissible voltage of one lamp alone, however, there are means provided for limiting the voltage supplied to one lamp to its maximum permissible voltage.

In a first embodiment of the invention the sub-miniature lamps are arranged in parallel push-pull and are then on one side connected with each other by a series connection of two ohmic resistors. The voltage of the connection point of these resistors is held constant by a suitable feedback.

In a different embodiment of the invention the lamps are connected in series and are together placed in parallel to the voltage stabilizer. The conducting wire between the lamps is also connected to two transistors via two resistors.

It is a particular advantage of the new arrangement that variations of the battery voltage do not affect the precise function of the device.

DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
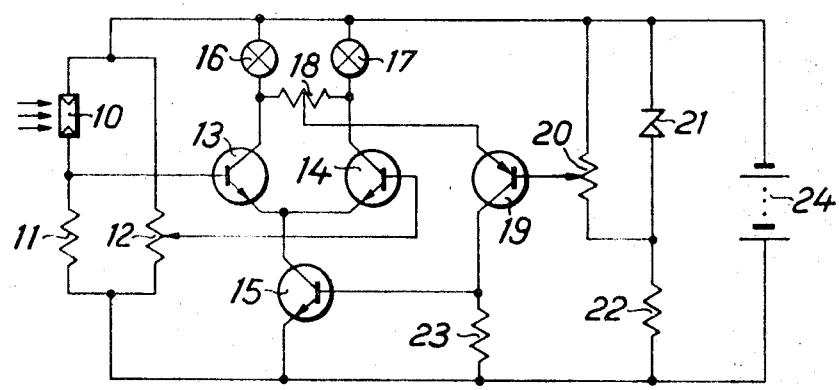
FIG. 1 shows the wiring diagram of a first embodiment of the invention.

Referring now to FIG. 1, there is shown a photo-electric resistor 10 that is connected with an ohmic resistor 11 and a potentiometer 12 in a bridge circuit. In the diagonal branch of the bridge is arranged a differential amplifier the two transistors 13 and 14 of which having a common high ohmic emitter resistance: the transistor 15. This transistor regulates the emitter current and the collector current of the transistors 13, 14.

In the collector line of the transistors 13 and 14 there are two sub-miniature incandescent lamps 16 and 17 functioning as collector-resistors. Lamp 16 is connected to the collector of transistor 13 and lamp 17 is connected to the collector of transistor 14. These connection lines are themselves interconnected by a resistor 18 having a central terminal which is connected to the emitter of a transistor 19. The base of the latter is connected to the wiper contact of a potentiometer 20 arranged in parallel to a Zener-diode 21 with which the ohmic resistor 22 is in series connection. The Zener-diode and the resistor 22 form a voltage stabilizer. By the potentiometer 20 an adjustable part of the Zener-voltage is fed to the base of the transistor 19. The collector of transistor 19 is connected to the base of transistor 15 and, further, is connected via a resistor 23 to the negative pole of the battery 24 which serves to supply the bridge as well as with the indicating device. The ohmic resistor 18 has the effect that a current also flows through this lamp which at the moment does not burn. By suitably designing the resistance value of this resistor 18 the whole device can be adjusted so that, when the bridge is balanced, either both lamps are burning, or so that a "range of darkness" of sufficient width is obtained around the balance point of the bridge. The feedback path 19, 15 keeps the potential between the central terminal of resistor 18 and the positive pole of battery 24 at a constant level. That means that the arithmetical mean of the voltage across the lamps 16 and 17 is held constant. That is, that the sum of these voltages is constant.

Figure 2:
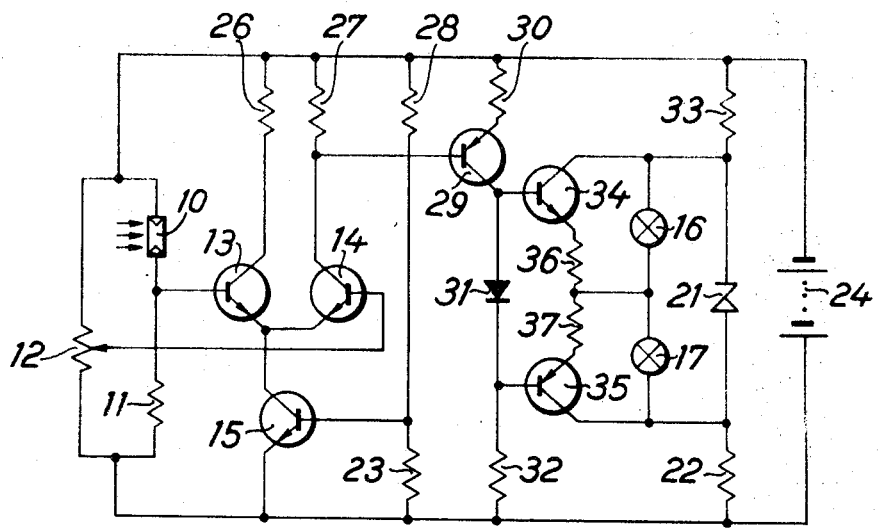
FIG. 2 shows the wiring diagram of a second embodiment of the invention.

The wiring diagram shown in FIG. 2 comprises a number of elements which have already been described in connection with FIG. 1. These like elements in FIG. 1 and FIG. 2 are designated by like reference numerals, and thus a repeated description of them can be dispensed with. New elements included in the diagram in FIG. 2 are, for example, the ohmic resistors 26, 27 which are used as collector resistors for the transistors 13, 14. The base of transistor 15 is biased by a voltage divider consisting of the ohmic resistors 23, 28. To the collector of transistor 14 is connected the base of a transistor 29 the emitter of which being connected to one pole of the battery 24 by means of a resistor 30, and the collector of transistor 29 being connected to the other pole of that battery via a rectifier 31 and a resistor 32.

The two sides of the rectifier 31 are connected to the base of transistors 34 and 35 respectively. The emitters of the latter are interconnected by means of the resistors 36, 37. In parallel to each serial connection of one of these resistors with the collector/emitter-line of one transistor there is arranged one of the sub-miniature lamps 16, 17. The collectors of the transistors 34, 35 are connected each to one side of a voltage divider consisting of a series connection of a voltage stabilizer 21 and two ohmic resistors 22, 33. Thus the lamps 16, 17 are in series and therefore the sum of the voltages of the lamps is held constant. This sum is higher than the maximum permissible voltage of each lamp. Therefore, in the case of balancing the bridge, when the voltages across the lamps are equal, these voltages are higher than the half of the maximum permissible voltage, the transistors 34, 35 function as variable resistors and control the brightness of the lamps. The resistors 36, 37 limit the current flow through the transistors parallel to the lamps, thus preventing an overcharge of the lamps.

What is claimed is:
1. Lamp indicator for the balance of a Wheatstone bridge, said indicator comprising in combination:
   a Wheatstone bridge circuit;
   a differential amplifier having a pair of transistors controlled by the bridge circuit;
   first and second sub-miniature incandescent lamps, each of said lamps being connected in the collector line of one of said pair of transistors respectively;
   an ohmic resistor interconnecting both collector sides of said lamps, said resistor having a central terminal;
   feedback means connected between said central terminal and said amplifier for stabilizing the voltage level at said central terminal in respect to the common terminal of the lamps;
   a voltage stabilizing circuit including a Zener-diode, and connected to said feedback means; and
   a DC-source for supplying the voltage to the bridge and the other circuits.
2. Lamp indicator for the balance of a Wheatstone bridge according to claim 1, wherein the feedback means includes a transistor the base of which regulates the emitter current of said transistors.
3. Lamp indicator for the balance of a Wheatstone bridge, said indicator comprising in combination:
   a Wheatstone bridge circuit;
   a differential amplifier controlled by the bridge circuit and having a single ended output, a pair of transistors controlled by the differential amplifier;
   two sub-miniature incandescent lamps connected in series to one another, said lamps being connected across the collectors of said transistors, a constant voltage source, said constant voltage source being connected across the collectors of said transistors in parallel with said lamps;
   a pair of series connected resistors connected across the emitters of said transistors, the junction point of said resistors being the junction point of said lamps; and
   a DC-source for supplying the voltage to the bridge and the other circuits.

References Cited

UNITED STATES PATENTS 3,040,179 6/1962 Bolt _____ 250—210 X
3,063,010 11/1962 Richardson _____ 250—210 X EDWARD E. KUBASIEWICZ, Primary Examiner U.S. Cl. X.R.

250—210; 324—123; 330—69; 340—285